United States Patent
Sun et al.

(10) Patent No.: US 12,438,588 B2
(45) Date of Patent: Oct. 7, 2025

(54) UE OPERATIONS FOR BEAM MANAGEMENT IN MULTI-TRP OPERATION

(71) Applicant: Apple Inc., Cupertino, CA (US)

(72) Inventors: Haitong Sun, Cupertino, CA (US); Chunxuan Ye, San Diego, CA (US); Dawei Zhang, Saratoga, CA (US); Hong He, San Jose, CA (US); Huaning Niu, Cupertino, CA (US); Oghenekome Oteri, San Diego, CA (US); Sigen Ye, Whitehouse Station, NJ (US); Wei Zeng, Saratoga, CA (US); Weidong Yang, San Diego, CA (US); Yeong-Sun Hwang, Germering (DE); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 17/593,484

(22) PCT Filed: Oct. 2, 2020

(86) PCT No.: PCT/CN2020/119776
§ 371 (c)(1),
(2) Date: Sep. 20, 2021

(87) PCT Pub. No.: WO2022/067842
PCT Pub. Date: Apr. 7, 2022

(65) Prior Publication Data
US 2022/0302972 A1    Sep. 22, 2022

(51) Int. Cl.
*H04L 5/00* (2006.01)
*H04B 7/06* (2006.01)
(Continued)

(52) U.S. Cl.
CPC ......... *H04B 7/0617* (2013.01); *H04B 7/0626* (2013.01); *H04L 5/0032* (2013.01);
(Continued)

(58) Field of Classification Search
CPC .... H04B 7/0617; H04B 7/0626; H04B 7/022; H04B 7/063; H04B 7/0695; H04L 5/0032;
(Continued)

(56) References Cited

U.S. PATENT DOCUMENTS 11,444,676 B2   9/2022   Takeda et al.
11,777,586 B2   10/2023  Shi et al.
(Continued)

FOREIGN PATENT DOCUMENTS

CN    110537387    12/2019
CN    110831196    2/2020
(Continued)

OTHER PUBLICATIONS

Apple Inc., "Discussion on beam measurement and reporting"; 3GPP TSG RAN WG1 Meeting #92; R1-1802288; Mar. 2, 2018; 11 sheets.
(Continued)

*Primary Examiner* — Pamit Kaur
(74) *Attorney, Agent, or Firm* — Fay Kaplun & Marcin, LLP (57) ABSTRACT

A user equipment (UE) reports beam management information to a network. The UE receives a first group of multiple reference signals from a first transmission reception point (TRP) of a network, receives a second group of multiple reference signals from a second different TRP of the network, selects a first beam associated with one of the multiple reference signals of the first group, selects a second beam associated with one of the multiple reference signals of the
(Continued)

second group and transmits a message to the network, the message including an indication of the selected first beam and second beam.

20 Claims, 6 Drawing Sheets

(51) Int. Cl.
    *H04L 41/06*     (2022.01)
    *H04W 24/02*     (2009.01)
    *H04W 76/10*     (2018.01)

(52) U.S. Cl.
    CPC ............ *H04L 5/0048* (2013.01); *H04L 41/06* (2013.01); *H04W 24/02* (2013.01); *H04W 76/10* (2018.02)

(58) Field of Classification Search
    CPC ..... H04L 5/0048; H04L 41/06; H04L 5/0023; H04L 5/0035; H04L 5/005; H04W 24/02; H04W 76/10
    See application file for complete search history.

(56) References Cited

U.S. PATENT DOCUMENTS

| | | | |
|---|---|---|---|
| 11,949,485 | B2 | 4/2024 | Koskela et al. |
| 12,191,962 | B2 | 1/2025 | Yang et al. |
| 12,323,218 | B2 | 6/2025 | Khoshnevisan et al. |
| 2019/0297603 | A1 | 9/2019 | Guo et al. |
| 2019/0379506 | A1* | 12/2019 | Cheng .................. H04L 1/0038 |
| 2020/0045569 | A1 | 2/2020 | Seo et al. |
| 2020/0068549 | A1 | 2/2020 | Kang et al. |
| 2020/0136787 | A1 | 4/2020 | Reial et al. |
| 2020/0195332 | A1 | 6/2020 | Kakishima et al. |
| 2020/0267712 | A1 | 8/2020 | Cirik et al. |
| 2020/0350972 | A1* | 11/2020 | Yi .............................. H04L 1/12 |
| 2020/0359404 | A1* | 11/2020 | Nilsson .................. H04B 7/088 |
| 2021/0021320 | A1 | 1/2021 | Koskela et al. |
| 2021/0028823 | A1* | 1/2021 | Park ......................... H04W 8/24 |
| 2021/0067229 | A1 | 3/2021 | Ryu et al. |
| 2021/0067288 | A1* | 3/2021 | Kakishima .............. H04L 5/005 |
| 2021/0314927 | A1* | 10/2021 | Noh ....................... H04L 5/0053 |
| 2021/0409098 | A1* | 12/2021 | Matsumura .......... H04B 7/0834 |
| 2022/0322325 | A1 | 10/2022 | Svedman et al. |
| 2023/0156845 | A1* | 5/2023 | Khoshnevisan .. H04W 74/0833 370/216 |
| 2023/0246697 | A1 | 8/2023 | Yuk et al. |
| 2023/0284197 | A1 | 9/2023 | Zhang et al. |
| 2025/0015865 | A1 | 1/2025 | Svedman et al. |

FOREIGN PATENT DOCUMENTS

| | | |
|---|---|---|
| CN | 111095845 | 5/2020 |
| CN | 111200872 | 5/2020 |
| CN | 111278122 | 6/2020 |
| CN | 111314035 | 6/2020 |
| CN | 111416644 | 7/2020 |
| WO | 2018/202036 | 11/2018 |
| WO | 2019/048934 | 3/2019 |
| WO | 2019/101034 | 5/2019 |
| WO | 2019/140389 | 7/2019 |
| WO | 2019/183878 | 10/2019 |

OTHER PUBLICATIONS

Nokia et al., "Enhancements on Beam Management for Multi-TRP/Panel Transmission"; 3GPP TSG RAN WG1 #102-e; R1-2006846; Aug. 28, 2020; 8 sheets.

Xiaomi, "Enhancement on beam management for Multi-TRP"; 3GPP TSG RAN WG1 #102-e; R1-2006546; Aug. 28, 2020; 3 sheets.

\* cited by examiner

UE OPERATIONS FOR BEAM MANAGEMENT IN MULTI-TRP OPERATION

BACKGROUND

A user equipment (UE) may establish a connection to at least one of multiple different networks or types of networks. Signaling between the UE and the network may be achieved via beamforming. Beamforming is an antenna technique used to transmit a directional signal which may be referred to as a beam.

A cell of the network may be configured with multiple transmission reception points (TRPs) each configured to perform beamforming. For example, the cell may transmit a first beam from a first TRP to the UE and a second beam from a second TRP to the UE. To acquire and maintain a beam between the UE and each of the TRPs, beam management techniques may be implemented on both the UE side and the network side.

SUMMARY

Some exemplary embodiments are related to a baseband processor configured to perform operations. The operations include receiving a first group of multiple reference signals from a first transmission reception point (TRP) of a network, receiving a second group of multiple reference signals from a second different TRP of the network, selecting a first beam associated with one of the multiple reference signals of the first group, selecting a second beam associated with one of the multiple reference signals of the second group and transmitting a message to the network, the message including an indication of the selected first beam and second beam.

Other exemplary embodiments are related to a user equipment (UE) including a transceiver configured to communicate with multiple networks and a processor communicatively coupled to the transceiver and configured to perform operations. The operations include receiving a first group of multiple reference signals from a first transmission reception point (TRP) of a network, receiving a second group of multiple reference signals from a second different TRP of the network, selecting a first beam associated with one of the multiple reference signals of the first group, selecting a second beam associated with one of the multiple reference signals of the second group and transmitting a message to the network, the message including an indication of the selected first beam and second beam.

Still further exemplary embodiments are related to a method performed by a user equipment (UE). The method includes receiving a first group of multiple reference signals from a first transmission reception point (TRP) of a network, receiving a second group of multiple reference signals from a second different TRP of the network, selecting a first beam associated with one of the multiple reference signals of the first group, selecting a second beam associated with one of the multiple reference signals of the second group and transmitting a message to the network, the message including an indication of the selected first beam and second beam.

DETAILED DESCRIPTION

The exemplary embodiments may be further understood with reference to the following description and the related appended drawings, wherein like elements are provided with the same reference numerals. The exemplary embodiments relate to beam management for multi-transmission reception point (TRP) operation.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

The exemplary embodiments are also described with regard to a 5G New Radio (NR) network. However, reference to a 5G NR network is merely provided for illustrative purposes. The exemplary embodiments may be utilized with any network that utilizes beamforming. Therefore, the 5G NR network as described herein may represent any type of network that implements beamforming.

A person of ordinary skill in the art would understand that beamforming is an antenna technique that is utilized to transmit or receive a directional signal. From the perspective of a transmitting device, beamforming may refer to propagating a directional signal. Throughout this description, a beamformed signal may be referred to as a "beam" or a "transmitter beam." The transmitter beam may be generated by having a plurality of antenna elements radiate the same signal. Increasing the number of antenna elements radiating the signal decreases the width of the radiation pattern and increases the gain. Thus, a transmitter beam may vary in width and be propagated in any of a plurality of different directions.

From the perspective of a receiving device, beamforming may refer to tuning a receiver to listen to a direction of interest. Throughout this description, the spatial area encompassed by the receiver listening in the direction of interest may be referred to as a "beam" or a "receiver beam." The receiver beam may be generated by configuring the parameters of a spatial filter on a receiver antenna array to listen in a direction of interest and filter out any noise from outside the direction of interest. Like a transmitter beam, a receiver beam may also vary in width and be directed in any of a plurality of different areas of interest.

In addition, the exemplary embodiments are described with regard to a next generation node B (gNB) that is configured with multiple TRPs. Throughout this description, a TRP generally refers to a set of components configured to transmit and/or receive a beam. In some embodiments, multiple TRPs may be deployed locally at the gNB. For example, the gNB may include multiple antenna arrays/panels that are each configured to generate a different beam. In other embodiments, multiple TRPs may be deployed at various different locations and connected to the gNB via a backhaul connection. For example, multiple small cells may be deployed at different locations and connected to the gNB. However, these examples are merely provided for illustrative purposes. Those skilled in the art will understand that TRPs are configured to be adaptable to a wide variety of different conditions and deployment scenarios. Thus, any reference to a TRP being a particular network component or multiple TRPs being deployed in a particular arrangement is merely provided for illustrative purposes. The TRPs described herein may represent any type of network component configured to transmit and/or receive a beam.

The exemplary embodiments relate to implementing beam management techniques on both the UE side and the network side. Beam management generally refers to a set of procedure configured to acquire and maintain a beam between a TRP and the UE. In a first aspect, the exemplary embodiments relate to beam reporting. As will be described in more detail below, on the network side, this may include multiple TRPs each transmitting a set of reference signals to the UE. The UE may collect measurement data using the reference signals, select a beam associated with each TRP and then report the selected beams to the network. In response to the beam reporting, the network may configure the UE with a beam from each TRP. In a second aspect, the exemplary embodiments relate to beam failure detection (BFD) and beam failure recovery (BFR) procedures. BFD generally relates to determining that a serving beam is not providing adequate quality and/or performance in the downlink. BFR generally relates to assisting the network with scheduling subsequent downlink communications using a different beam that is likely to provide adequate quality and/or performance in the downlink. The exemplary beam management techniques described herein may be used in conjunction with currently implemented beam management mechanisms, future implementations of beam management mechanisms or independently from other beam management mechanisms.

Figure 1:
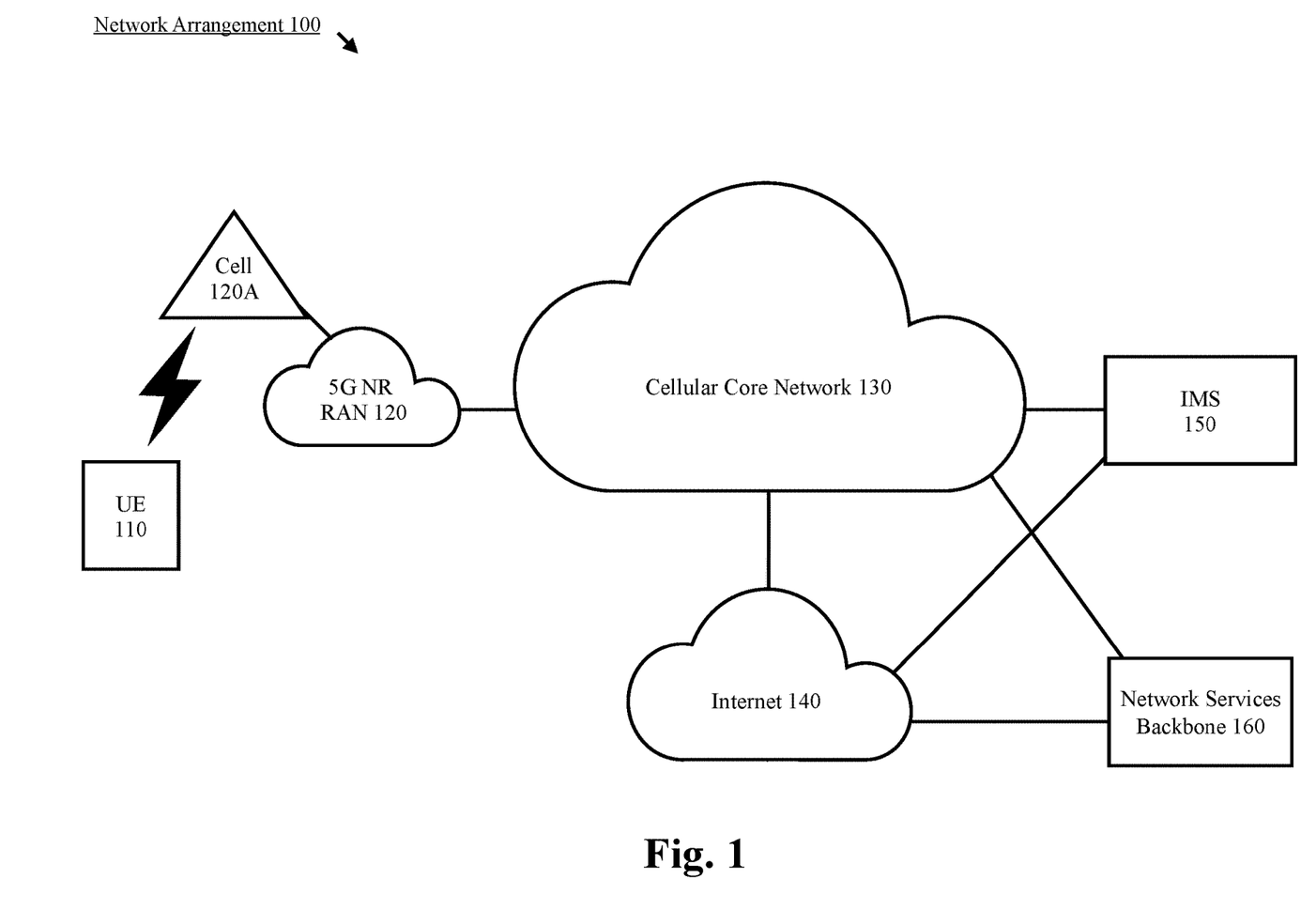
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g. 5G cloud RAN, a next generation RAN (NG-RAN), a long term evolution RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a cell 120A that represents a gNB that is configured with multiple TRPs. Each TRP may represent one or more components configured to transmit and/or receive a beam. In some embodiments, multiple TRPs may be deployed locally at the cell 120A. In other embodiments, multiple TRPs may be distributed at different locations and connected to the gNB.

Figure 2:
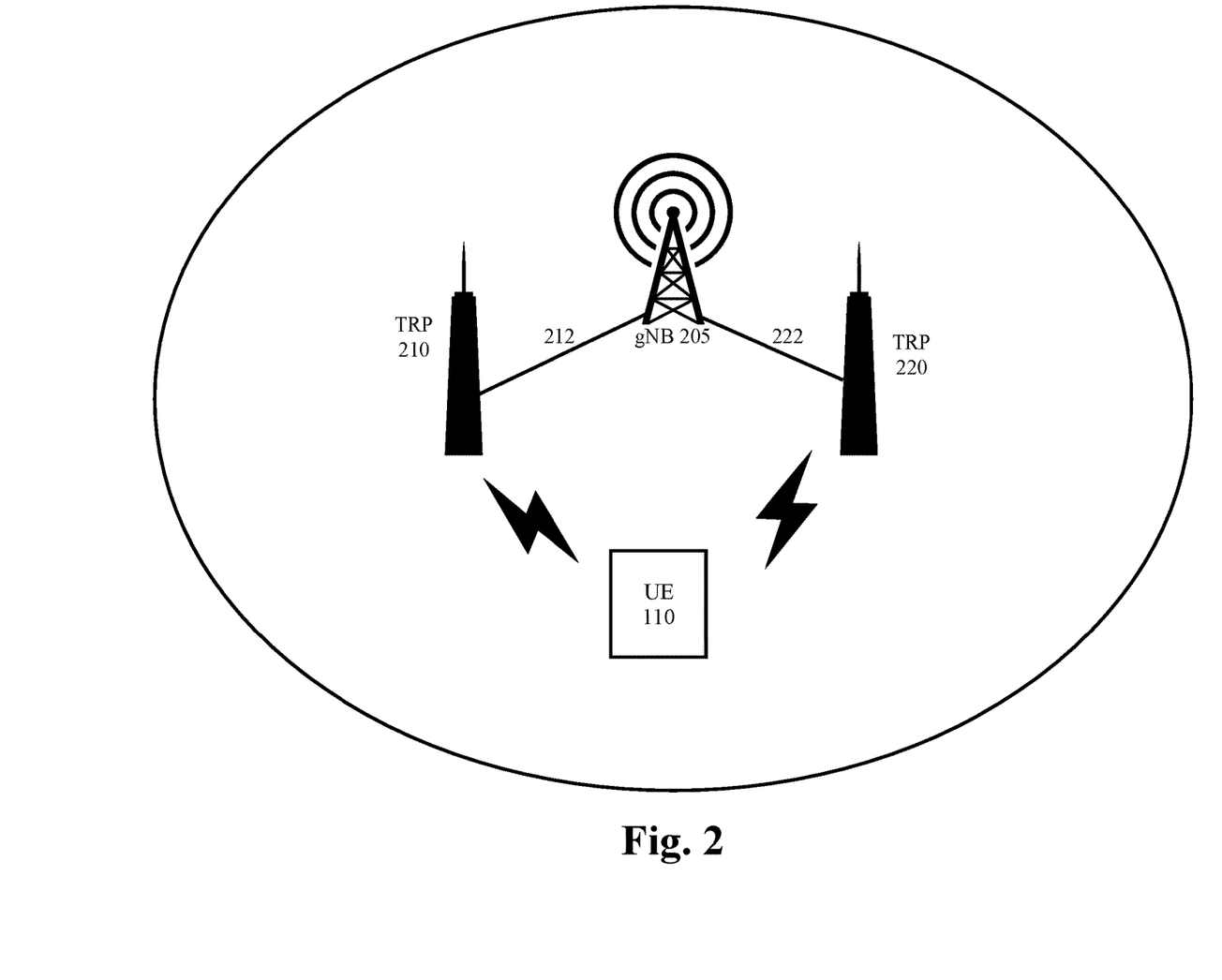
FIG. 2 shows an example of multiple transmission reception points (TRPs) deployed at different locations.

FIG. 2 shows an example of multiple TRPs deployed at different locations. In this example, the gNB 205 is configured with a first TRP 210 via a backhaul connection 212 and a second TRP 220 via backhaul connection 222. Each of the TRPs 210, 220 may transmit a beam to and/or receive a beam from the UE 110. However, the gNB 205 may be configured to control the TRPs 210, 220 and perform operations such as, but not limited to, assigning resources, configuring group pairs, configuring reporting restrictions, implementing beam management techniques, etc.

The example shown in FIG. 2 is not intended to limit the exemplary embodiments in any way. Those skilled in the art will understand that 5G NR TRPs are adaptable to a wide variety of different conditions and deployment scenarios. An actual network arrangement may include any number of different types of cells and/or TRPs being deployed by any number of RANs in any appropriate arrangement. Thus, the example of a single cell 120A in FIG. 1 and a single gNB 205 with two TRPs 210, 220 in FIG. 2 is merely provided for illustrative purposes.

Returning to the network arrangement 100 of FIG. 1, the cell 120A may include one or more communication interfaces to exchange data and/or information with UEs, the corresponding RAN, the cellular core network 130, the internet 140, etc. Further, the cell 120A may include a processor configured to perform various operations. For example, the processor of the cell 120A may be configured to perform operations related to access barring. However, reference to a processor is merely for illustrative purposes. The operations of the cell 120A may also be represented as a separate incorporated component of the cell 120A or may be a modular component coupled to the cell 120A, e.g., an integrated circuit with or without firmware. For example, the integrated circuit may include input circuitry to receive signals and processing circuitry to process the signals and other information. In addition, in some examples, the functionality of the processor is split among two or more processors such as a baseband processor and an applications processor. The exemplary embodiments may be implemented in any of these or other configurations of a cell.

The UE 110 may connect to the 5G NR-RAN 120 via the cell 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the cell 120A). However, as mentioned above, reference to the 5G NR-RAN 120 is merely for illustrative purposes and any appropriate type of RAN may be used.

In addition to the 5G NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 3:
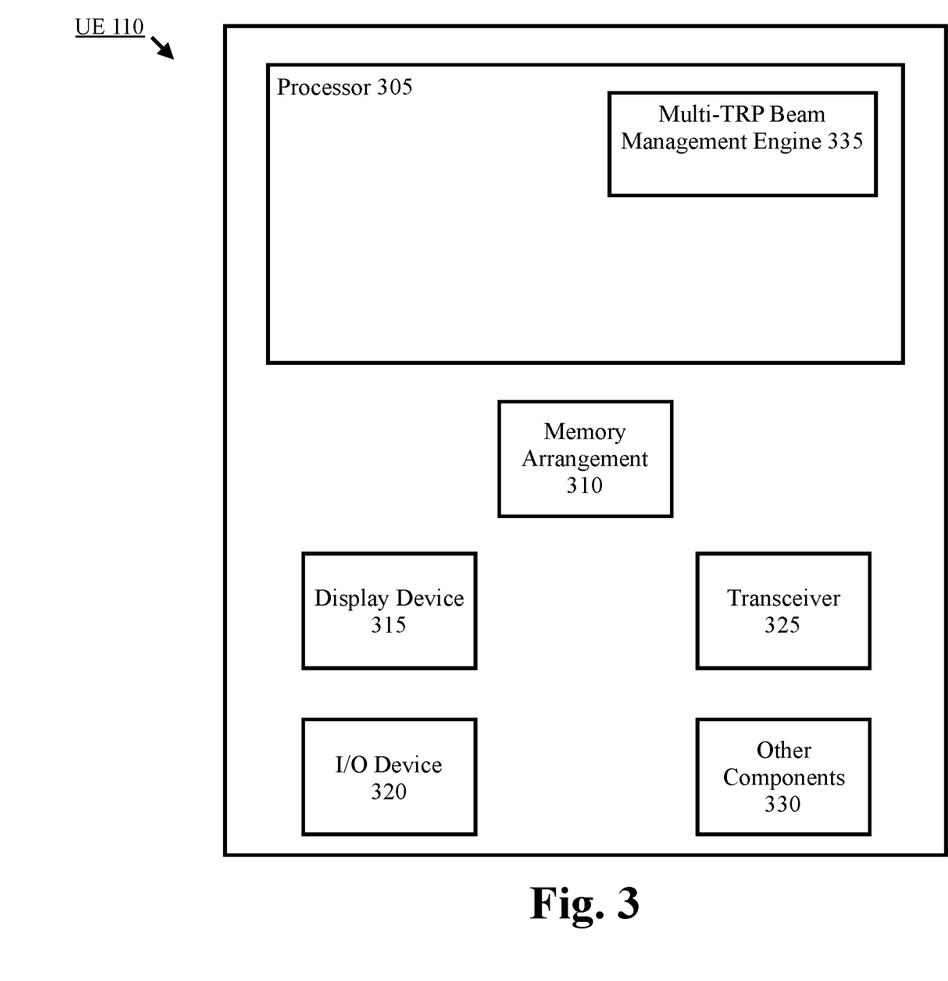
FIG. 3 shows an exemplary user equipment (UE) according to various exemplary embodiments.

FIG. 3 shows an exemplary UE 110 according to various exemplary embodiments. The UE 110 will be described with regard to the network arrangement 100 of FIG. 1. The UE 110 may include a processor 305, a memory arrangement 310, a display device 315, an input/output (I/O) device 320, a transceiver 325 and other components 330. The other components 330 may include, for example, an audio input device, an audio output device, a power supply, a data acquisition device, ports to electrically connect the UE 110 to other electronic devices, etc.

The processor 305 may be configured to execute a plurality of engines of the UE 110. For example, the engines may include a multi-TRP beam management engine 335. The multi-TRP beam management engine 335 may be configured to perform operations related to beam management such as, collecting measurement data, beam selection, beam failure detection, beam failure recovery, etc.

The above referenced engine being an application (e.g., a program) executed by the processor 305 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory arrangement 310 may be a hardware component configured to store data related to operations performed by the UE 110. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR-RAN 120, an LTE-RAN (not pictured), a legacy RAN (not pictured), a WLAN (not pictured), etc. Accordingly, the transceiver 325 may operate on a variety of different frequencies or channels (e.g., set of consecutive frequencies).

Figure 4:
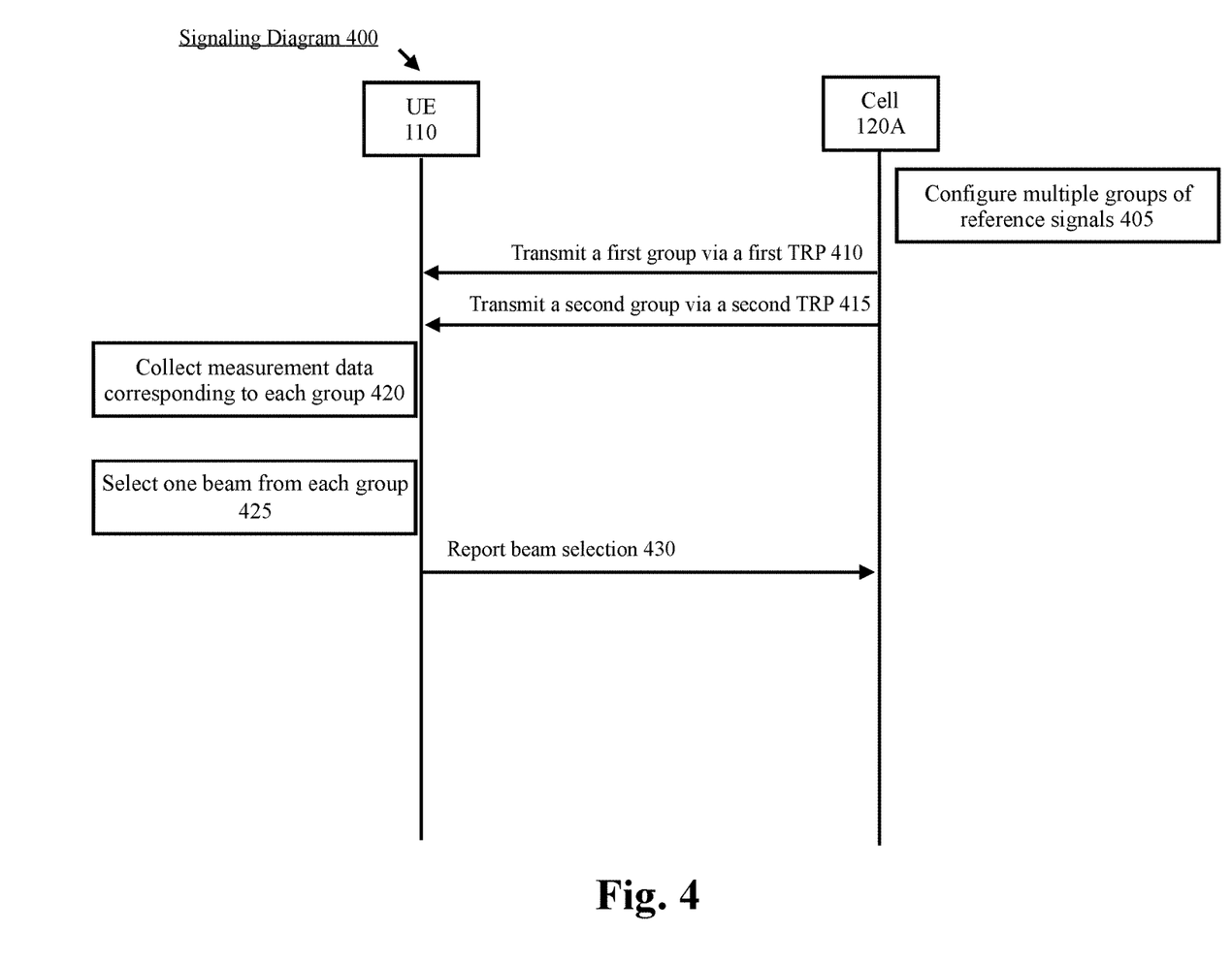
FIG. 4 shows a signaling diagram for an exemplary multi-TRP beam reporting procedure according to various exemplary embodiments.

As mentioned above, in a first aspect, the exemplary embodiments relate to beam reporting for multi-TRP operation. FIG. 4 shows a signaling diagram 400 for an exemplary multi-TRP beam reporting procedure according to various exemplary embodiments. The signaling diagram 400 is described with regard to the network arrangement 100 of FIG. 1 and the UE 110 of FIG. 3.

For beam reporting, a TRP may transmit multiple beams to the UE 110. Each beam may include reference signals that are to be measured by the UE 110. The UE 110 may then select a beam and report the selection to the network. In response, the network may send downlink data to the UE 110 via the selected beam. The example provided below will describe a beam reporting procedure for multi-TRP operation that includes implementing various exemplary beam management techniques on the UE 110 side and on the network side.

The signaling diagram 400 includes the UE 110 and the cell 120A. As mentioned above, the cell 120A may represent a gNB configured with multiple TRPs. In some embodiments, the TRPs may be deployed locally at the gNB. In other embodiments, the TRPs may be deployed at various different locations and connect to the gNB via a backhaul connection. An example of this distributed arrangement is shown in FIG. 2. The signaling diagram 400 is described with regard to a first TRP and a second TRP. However, the exemplary embodiments are not limited to two TRPs, those skilled in the art will understand how the exemplary concepts described herein may apply to any appropriate number of TRPs.

In 405, the cell 120A may configure multiple groups of reference signals and each group may correspond to a single TRP. For example, a first group of reference signals may be configured for transmission by a first TRP and a second group of reference signals may be configured for transmission by a second TRP. Throughout this description, the term "group pair" may refer to a first group of reference signals configured for transmission by a first TRP that are associated with a second group of reference signals configured for transmission by a second TRP.

For group reporting, the cell 120A may constrain the group pair to reflect whether the cell 120A can transmit at the same time. For example, a gNB may not be able to transmit multiple beams from the same TRP simultaneously. However, the gNB may be able to transmit different beams from different TRPs simultaneously.

Figure 5:
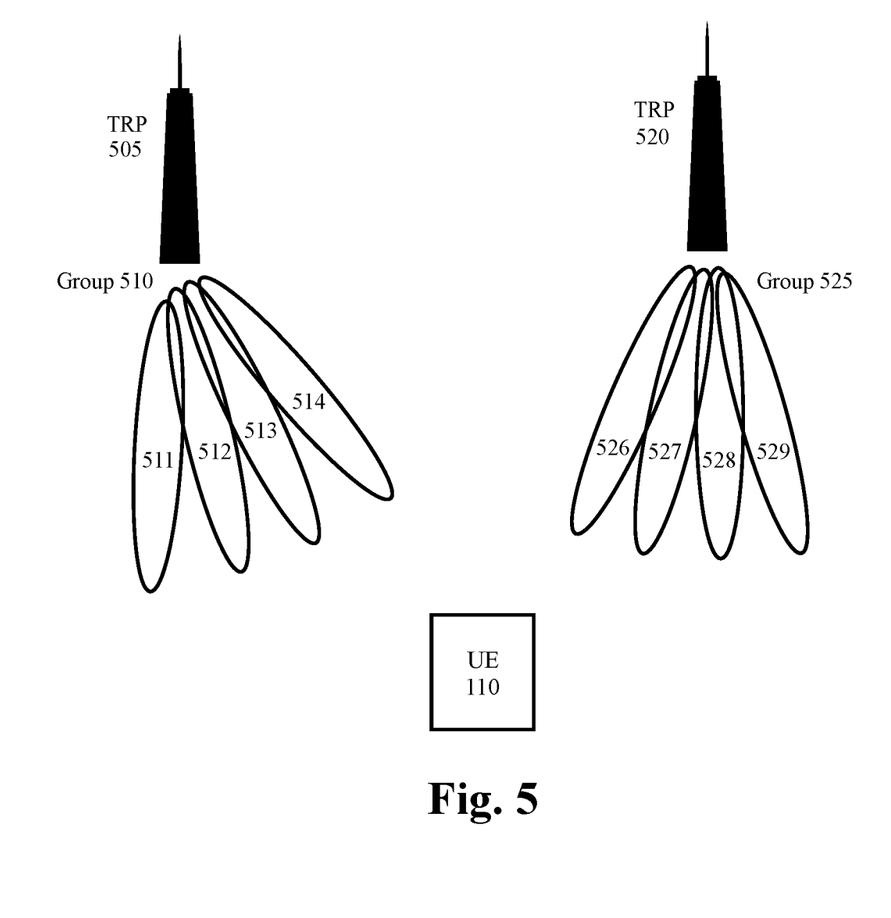
FIG. 5 illustrates an example of a channel state information reference signal (CSI-RS) group pair.

A group of reference signals may refer to a group of channel state information reference signals (CSI-RS), a group of synchronization signal blocks (SSBs) or a group of any other appropriate type of reference signals. FIG. 5 illustrates an example of a CSI-RS group pair. In this example, a first TRP 505 performs a sweep using a first group of CSI-RS 510 that includes CSI-RS 511-514 and a second TRP 520 performs a sweep using a second group of CSI-RS 525 that includes CSI-RS 526-529. The first group of CSI-RS 510 and the second group of CSI-RS 525 are associated with one another to form a group pair. As will be described in more detail below, in this type of scenario, the UE 110 may collect measurement data corresponding to each group 510, 525. The UE 110 may then select one of CSI-RS 511-514 from the first group 510 and one of CSI-RS 526-529 from the second group 525. Subsequently, the first TRP 505 may be configured to provide the UE 110 with downlink data using a beam corresponding to the CSI-RS selected from the first group 510 and the second TRP 520 may be configured to provide the UE 110 with downlink data using a beam corresponding to the CSI-RS selected from the second group 525.

Returning to the signaling diagram 400 of FIG. 4, in some embodiments, a CSI-RS group may be based on a non-zero power (NZP)-CSI-RS-ResourceSet. As indicated above, each NZP-CSI-RS-ResourceSet may correspond to one TRP. In some embodiments, each NZP-CSI-RS-ResourceSet may correspond to a different TRP. In other embodiments, each NZP-CSI-RS-ResourceSet may correspond to the same TRP. In addition, for an NZP-CSI-RS-ResourceSet, multiple NZP-CSI-RS-Resources can be configured belonging to different groups.

For a group of either NZP-CSI-RS-ResourceSet or NZP-CSI-RS-Resource, the following configurations may be utilized. In some embodiments, each NZP-CSI-RS-ResourceSet or NZP-CSI-RS-Resource may be configured with a physical cell ID (PCI). In some embodiments, each NZP-CSI-RS-ResourceSet or NZP-CSI-RS-Resource may be configured with a CORESETPoolIndex. In some embodiments, each NZP-CSI-RS-ResourceSet or NZP-CSI-RS-Resource may be configured with a separate group index. If the group configuration is missing, the UE 110 may assume that the group is from the first TRP (e.g., index 0).

Prior to the transmission of the group pair, the network may provide the UE 110 with a CSI-ReportConfig message that is configured to indicate to the UE 110 how to report various types of CSI. When group based reporting is configured, the network may include group based reporting information in the CSI-ReportConfig message or any other appropriate message.

In some embodiments, the CSI-ReportConfig message may indicate a bitmap based on the CSI-RS resource level. To provide an example, for (N) CSI-RS or SSB, a (N) bitmap may be configured. For each bit, a 0 may indicate that the corresponding CSI-RS or SSB belongs to the first TRP and a 1 may indicate that the corresponding CSI-RS or SSB belongs to the second TRP. In some embodiments, the CSI-ReportConfig message may indicate segmentation at the resource level. To provide an example, for (N) CSI-RS or SSB, the gNB may configure a single value (M)<(N), the first (M) CSI-RS resources may correspond to the first TRP and the remaining N-M CSI-RS resources may correspond to the second TRP. The examples provided above were described at the CSI-RS resource level, however, those skilled in the art will understand that the above examples may also be applies to the CSI-RS resource set level.

When multiple groups of resources are configured, the gNB may use the CSI-ReportConfig message or any other appropriate message to configure the UE 110 to select a beam based on particular criteria. One exemplary criterion instructs the UE 110 to perform beam selection on one group independently of the other group. In other words, the selection of a beam from one group is not correlated to the selection of a beam from the other group. This allows the UE 110 maximize the received reference signal received power (RSRP) or signal-to-interference-to-noise ratio (SINR). Another exemplary criterion instructs the UE 110 to jointly select beams in different resource groups. In other words, the UE 110 may consider the mutual interference of both beams.

In 410, the cell 120A may transmit a first group to the UE 110 via a first TRP. In 415, the cell 120A may transmit a second group to the UE 110 via a second TRP.

In 420, the UE 110 may collect measurement data corresponding to each group. For example, the UE 110 may collect measurement data corresponding to each CSI-RS or SSB of the first group and measurement data corresponding to each CSI-RS or SSB of the second group.

In 425, the UE 110 may select one beam from each group. The selection may be performed in accordance with information received from the network, the collected measurement data and/or any other appropriate factors.

In 430, the UE 110 may report the beam selection to the network. In some embodiments this may include transmitting information to the gNB. In other embodiments, this may include performing an uplink transmission to the TRPs using an uplink resource associated with the selected beam. However, these examples are merely provided for illustrative purposes, the UE 110 may report the beam selection and/or the corresponding measurement data to the network in any appropriate manner.

Figure 6:
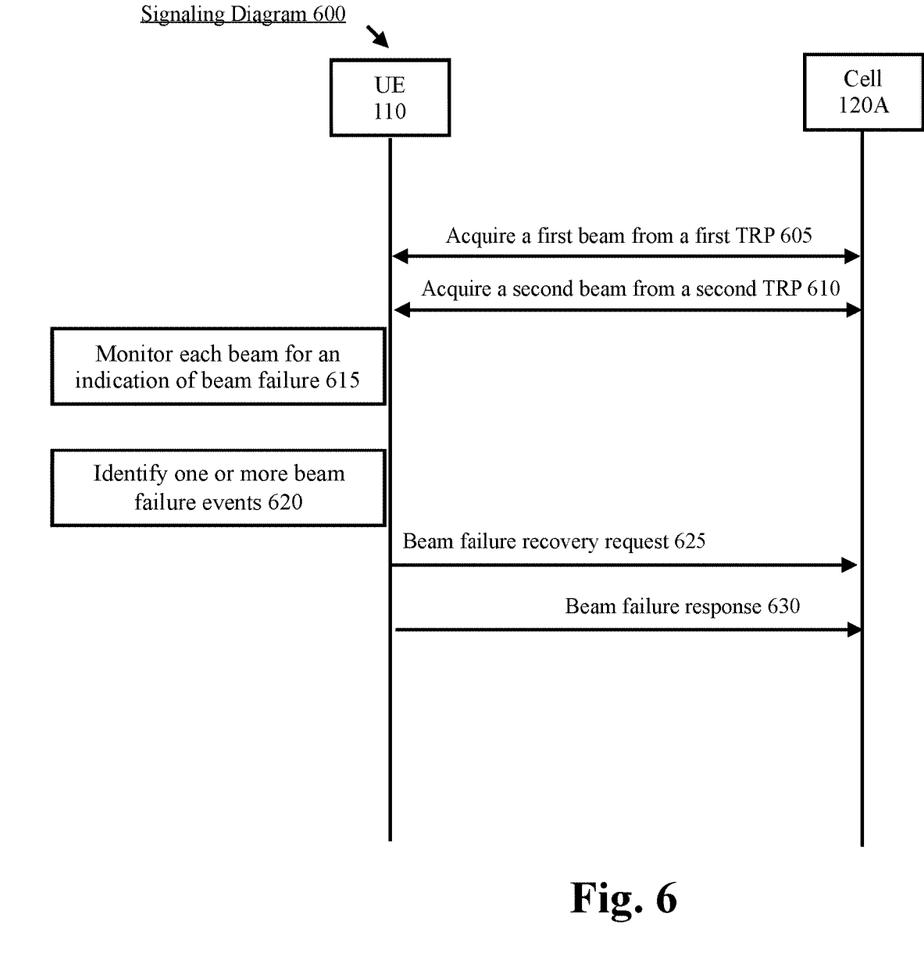
FIG. 6 shows a signaling diagram for an exemplary beam failure procedure for multi-TRP operation according to various exemplary embodiments.

FIG. 6 shows a signaling diagram 600 for an exemplary beam failure procedure for multi-TRP operation according to various exemplary embodiments. The signaling diagram 600 will be described with regard to the network arrangement 100 of FIG. 1 and the UE 110 of FIG. 2.

The signaling diagram 400 described various examples of how the UE 110 may acquire multiple beams from different TRPs. The signaling diagram 600 will describe various examples of how beam failure recovery may be performed when the UE 110 is configured with multiple beams from multiple TRPs. The signaling diagram 600 includes the UE 110 and the cell 120A.

As mentioned above, the cell 120A may represent a gNB configured with multiple TRPs. In some embodiments, the TRPs may be deployed locally at the gNB. In other embodiments, the TRPs may be deployed at various different locations and connect to the gNB via a backhaul connection. An example of this distributed arrangement is shown in FIG. 2. The signaling diagram 600 is described with regard to a first TRP and a second TRP. However, the exemplary embodiments are not limited to two TRPs, those skilled in the art will understand how the exemplary concepts described herein may apply to any appropriate number of TRPs.

In 605, the UE 110 acquires a first set of beams from a first TRP. In 610, the UE 110 acquires a second set of beams from a second TRP. In 615, the UE 110 monitors each beam for an indication of beam failure.

For multi-TRP operations, beam failure may be triggered for each TRP. Thus, each set of beams may include reference signals (e.g., Radio Link Monitoring RS) configured to beam failure detection. The UE 110 may collect measurement data corresponding to these reference signals and declare beam failure when a predetermined condition is met (e.g., one or more measurement values fall below a predetermined threshold, etc.).

On the network side, for multi-downlink control information (multi-DCI) based multi-TRP, to configure the per TRP Radio Link Monitoring RS, CORESETPoolIndex or PCI can be configured wot each Radio Link Monitoring RS or a group of Radio Link Monitoring RS. In some embodiments, when Radio Link Monitoring RS is not configured for a TRP, the UE 110 may monitor the beam used for physical downlink control channel (PDCCH) reception for the CORESET configured with the corresponding CORESETPoolIndex or PCI.

In 620, the UE 110 identifies one or more beam failure events. In 625, the UE 110 transmits a beam failure recovery request to the cell 120A indicating that one or more beam failure events have occurred.

If the beam failure event at a TRP that is operating as a primary cell (PCell), different physical random access channel (PRACH) sequences/configuration may be used to indicate which TRP has beam failure. To provide an example, for a contention free RACH (CFRA) based beam failure request, a radio resource control (RRC) or medium access channel control element (MAC-CE) may be used to indicate which TRP has beam failure. If the beam failure event at a TRP that is operating as a secondary cell (SCell), a MAC-CE may be used to indicate which TRP has beam failure.

Separate candidate beams may be configured for each TRP. For intra-cell multi-TRP, CORESETPoolIndex may be used to indicate and configure the candidate beam for each TRP. For inter-cell multi-TRP, PCI can be used to indicate and configure the candidate beam for each TRP. This candidate information may be provided by the UE 110 in the beam failure recovery request or in any other appropriate message.

In 630, the cell 120A may transmit a beam failure response to the UE 110. In some embodiments, a separate search space may be configured for each TRP. For intra-cell multi-TRP, CORESETPoolIndex may be used to indicate and configure the recovery search space for each TRP. For inter-cell multi-TRP, PCI may be used to indicate and configure the recovery search space for each TRP.

In some embodiments, after the UE 110 triggers the beam failure request for a particular TRP, the UE 110 may automatically update the beam of the following channels based on the UE 110 indicated candidate beam. For downlink reception, the channels may include the physical downlink shared channel (PDSCH) and the PDCCH. For uplink transmission, the channel include physical uplink control channel (PUCCH) and physical uplink shared channel (PUCCH).

In some embodiments, the UE 110 may only update the beam in the corresponding TRP that the UE 110 triggers beam failure. For intra-cell multi-TRP, the UE 110 may indicate which TRP using the corresponding CORESETPoolIndex. For inter-cell multi-TRP, the UE 110 may indicate which TRP using the corresponding PCI.

During operation, when the UE 110 is configured with multi-TRP, the UE 110 may be configured to receive overlapping CORESET in the time domain with different quasi co-located (QCL)-type D. In this type of scenario, if the UE 110 has previously reported the corresponding transmission indicator (TCI), the UE 110 may be monitoring two CORESETs simultaneously. In some embodiments, further restrictions may be imposed in the time domain (e.g. in the past (x) slots or milliseconds (ms)). Other indicators that may be monitored and reported may include one or more of reference signal indicators such as a CSI-RS Resource Indicator (CRI), a SS/PBCH Resource Block Indicator (SSBRI), a scheduling request indicator (SRI) or a sounding reference signal (SRS).

Otherwise, the UE 110 monitors the CORESET with the beam from the highest priority CORESET. In this type of scenario, the UE 110 may or may not monitor the other CORESETs with lower priority. The priority may be determined based on the following factors, CORSET index, CORSESETPoolIndex, SearchSpace index, Search Space periodicity, PCI, service cell index, or any other appropriate factor.

In some embodiments, there may be a collision of different channels overlapping in the time domain with different QCL-typeD reception (e.g., PDCCH and PDSCH, PDSCH and PDSCH, PDSCH and CSI-RS, CSI-RS and CSI-RS. In this type of scenario, priority may be defined to determine which beam to use and the skipping of some channels. To provide an example, SSB may be the highest priority, CORESET may be the second highest priority, high priority downlink grant (DG)-PDSCH may be the third highest priority, high priority semi-persistent scheduling (SPS)-PDSCH may be the fourth highest priority, aperiodic CSI-RS may be the second fifth priority, low priority DG-PDSCH may be the sixth highest priority, low priority SPS-PDSCH may be the seventh highest priority, semi-persistent-PDSCH may be the eighth highest priority and periodic CSI-RS may be the lowest priority. However, the above example is merely provided for illustrative purposes, the priority order may be configured in any appropriate manner.

Alternatively, for single-DCI based Multi-TRP, to configure the per TRP Radio Link Monitoring RS, PCI or any other appropriate logic index may be configured for each Radio Link Monitoring RS or a group of Radio Link Monitoring RS. When Radio Link Monitoring RS is not configured for a TRP, the UE 110 may monitor the beam used for PDCCH reception for the CORESET configured with the corresponding PCI.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A baseband processor configured:
receive a first group of multiple reference signals from a first transmission reception point (TRP) of a network;
receive a second group of multiple reference signals from a second different TRP of the network, wherein the first group of multiple reference signals consists of multiple channel state information (CSI) reference signals (RSs) corresponding to the first TRP, and the second group of multiple reference signals consists of multiple synchronization signal blocks (SSBs) corresponding to the second TRP;
select a first beam associated with one of the multiple reference signals of the first group;
select a second beam associated with one of the multiple reference signals of the second group; and
transmit a message to the network, the message including an indication of the selected first beam and second beam.

2. The baseband processor of claim 1, wherein the first group includes a first non-zero power-channel state information-reference signal-resource set (NZP-CSI-RS-Resourceset).

3. The baseband processor of claim 2, wherein the first NZP-CSI-RS-resource set is configured with one of a physical cell ID (PCI), a CORESETPoolIndex or a group index.

4. The baseband processor of claim 2, further configured to:
determine an index value for the first NZP-CSI-RS-resource set based on identifying that the first NZP-CSI-RS-resource set is not configured with a physical cell ID (PCI), a CORESETPoolIndex or a group index.

5. The baseband processor of claim 1, further configured to:
receiving a channel state information (CSI) report configuration message from the network.

6. The baseband processor of claim 5, further configured to:
identifying that the first group of multiple reference signals is transmitted by the first TRP and that the second group of multiple reference signal is transmitted by the second TRP based on a bitmap that is included in the CSI report configuration message, wherein the bitmap is configured as a CSI-reference signal (RS) level or a CSI-RS resource set level.

7. The baseband processor of claim 5, further configured to:
identifying that the first group of multiple reference signals is transmitted by the first TRP and that the second group of multiple reference signals is transmitted by the second TRP based on a value included in the CSI report configuration message.

8. The baseband processor of claim 5, wherein selecting the first beam is performed independently from selecting the second beam in response to an indication included in the CSI report configuration message.

9. The baseband processor of claim 5, wherein selecting the first beam is performed jointly with selecting the second beam based on mutual interference in response to an indication included in the CSI report configuration message.

10. The baseband processor of claim 1, further configured to:
monitor the first group of multiple reference signals configured as radio link monitoring reference signals configured with a CORESETPoolIndex or a physical cell ID (PCI) to be used for beam failure detection of the first TRP; and
monitor the second group of multiple reference signals configured as radio link monitoring reference signals configured with a different CORESETPoolIndex or a different physical cell ID (PCI) to be used for beam failure detection of the second TRP.

11. The baseband processor of claim 1, the operations further comprising:
reporting multiple reference signal indicators to the network, wherein the multiple reference signal indicators comprise two or more of a CSI-RS Resource Indicator (CRI), a SS/PBCH Resource Block Indicator (SSBRI), a scheduling request indicator (SRI) or a sounding reference signal (SRS);
determining that a first CORESET and a second CORESET are to overlap in time with different quasi-co located (QCL)-typeD; and
monitoring the the first CORESET and the second CORESET simultaneously based on previously reporting a multiple transmission configuration indicator (TCI).

12. The baseband processor of claim 1, further configured to:
determine that a first CORESET and a second CORESET are to overlap in time with different quasi-co located (QCL)-typeD; and
select the first CORESET to prioritize over the second CORESET based on at least one of a CORESET index, a CORESETPoolIndex, a search space index, a search space periodicity, a physical cell ID (PCI) or a serving cell index.

13. A user equipment (UE), comprising:
a transceiver configured to communicate with multiple networks; and
a processor communicatively coupled to the transceiver and configured to perform operations comprising:
receiving a first group of multiple reference signals from a first transmission reception point (TRP) of a network;
receiving a second group of multiple reference signals from a second different TRP of the network, wherein the first group of multiple reference signals consists of multiple channel state information (CSI) reference signals (RSs) corresponding to the first TRP, and the second group of multiple reference signals consists of multiple synchronization signal blocks (SSBs) corresponding to the second TRP;
selecting a first beam associated with one of the multiple reference signals of the first group;
selecting a second beam associated with one of the multiple reference signals of the second group; and
transmitting a message to the network, the message including an indication of the selected first beam and second beam.

14. The UE of claim 13, wherein the first group includes a first non-zero power-channel state information-reference signal-resource set (NZP-CSI-RS-Resourceset).

15. The UE of claim 13, the operations further comprising:
receiving a channel state information (CSI) report configuration message from the network; and
identifying that the first group of multiple reference signals is transmitted by the first TRP and that the second group of multiple reference signals is transmitted by the second TRP based on the CSI report configuration message.

16. The UE of claim 13, the operations further comprising:
monitoring the first group of multiple reference signals configured as radio link monitoring reference signals configured with a CORESETPoolIndex or a physical cell ID (PCI) to be used for beam failure detection of the first TRP; and
monitoring the second group of multiple reference signals configured as radio link monitoring reference signals configured with a different CORESETPoolIndex or a different physical cell ID (PCI) to be used for beam failure detection of the second TRP.

17. A method, comprising:

at a user equipment (UE):
- receiving a first group of multiple reference signals from a first transmission reception point (TRP) of a network;
- receiving a second group of multiple reference signals from a second different TRP of the network, wherein the first group of multiple reference signals consists of multiple channel state information (CSI) reference signals (RSs) corresponding to the first TRP, and the second group of multiple reference signals consists of multiple synchronization signal blocks (SSBs) corresponding to the second TRP;
- selecting a first beam associated with one of the multiple reference signals of the first group;
- selecting a second beam associated with one of the multiple reference signals of the second group; and
- transmitting a message to the network, the message including an indication of the selected first beam and second beam.

18. The method of claim 17, wherein the first group includes a first non-zero power-channel state information-reference signal-resource set (NZP-CSI-RS-Resourceset).

19. The method of claim 17, further comprising:
- receiving a channel state information (CSI) report configuration message from the network; and
- identifying that the first group of multiple reference signals is transmitted by the first TRP and that the second group of multiple reference signals is transmitted by the second TRP based on the CSI report configuration message.

20. The method of claim 17, further comprising:
- monitoring the first group of multiple reference signals configured as radio link monitoring reference signals configured with a CORESETPoolIndex or a physical cell ID (PCI) to be used for beam failure detection of the first TRP; and
- monitoring the second group of multiple reference signals configured as radio link monitoring reference signals configured with a different CORESETPoolIndex or a different physical cell ID (PCI) to be used for beam failure detection of the second TRP.

* * * * *